(12) United States Patent
Hellam et al.

(10) Patent No.: US 10,304,234 B2
(45) Date of Patent: May 28, 2019

(54) VIRTUAL ENVIRONMENT RENDERING

(71) Applicant: Disney Enterprises, Inc., Burbank, CA (US)

(72) Inventors: Taylor S. Hellam, Fresno, CA (US); Kimberly K. Porter, Altadena, CA (US); Mohammad S. Poswal, Santa Clara, CA (US); Malcolm E. Murdock, Los Angeles, CA (US); Aradhana Modi, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 77 days.

(21) Appl. No.: 15/367,074

(22) Filed: Dec. 1, 2016

(65) Prior Publication Data
US 2018/0158231 A1    Jun. 7, 2018

(51) Int. Cl.
*G06T 15/04*    (2011.01)

(52) U.S. Cl.
CPC .................................. *G06T 15/04* (2013.01)

(58) Field of Classification Search
None
See application file for complete search history.

(56) References Cited

U.S. PATENT DOCUMENTS

| 7,391,417 B2 | 6/2008 | Osako |
| 8,808,089 B2 | 8/2014 | Davis |
| 9,092,437 B2 | 7/2015 | Joy |
| 9,390,560 B2 | 7/2016 | Meier |
| 9,407,904 B2 | 8/2016 | Sandrew |
| 2012/0212509 A1* | 8/2012 | Benko .................... G03B 35/00 345/633 |
| 2013/0212538 A1 | 8/2013 | Lemire |
| 2014/0253553 A1 | 9/2014 | Jovanovic |
| 2015/0062125 A1 | 3/2015 | Aguilera Perez |
| 2015/0091905 A1* | 4/2015 | Wang ..................... G06T 19/00 345/427 |

(Continued)

OTHER PUBLICATIONS

Author, Unknown. "State of Play at SIGGRAPH 2015." *Youtube*, https://www.youtube.com/watch?v=7GO_qXcLCt8. Aug. 13, 2015.

(Continued)

*Primary Examiner* — Nurun N Flora
(74) *Attorney, Agent, or Firm* — Farjami & Farjami LLP

(57) ABSTRACT

A system for rendering a virtual environment includes a hardware processor, a memory, and a simulation generator software code stored in the memory. The hardware processor is configured to execute the simulation generator software code to receive a three-dimensional-representation (3D-representation) of a physical object, and to receive a two-dimensional-image (2D-image) of the physical object. The hardware processor is also configured to execute the simulation generator software code to compose a simulation of the virtual environment using the 3D-representation and the 2D-image, in which the 3D-representation of the physical object is situated between the 2D-image of the physical object and a predetermined viewpoint of the virtual environment. The hardware processor further executes the simulation generator software code to render the virtual environment such that the 2D-image of the physical object, but not the 3D-representation of the physical object, is visibly rendered.

20 Claims, 6 Drawing Sheets

(56) References Cited

U.S. PATENT DOCUMENTS

| | | |
|---|---|---|
| 2015/0178988 A1 | 6/2015 | Montserrat Mora |
| 2016/0171335 A1 | 6/2016 | Aguilera Perez |
| 2016/0253842 A1* | 9/2016 | Shapira ................ G02B 27/017 |
| | | 345/633 |

OTHER PUBLICATIONS

Author, Unknown. "How can I create the illusion of a 3D object moving around in a static background?" *Stack Exchange*, https://gamedev.stackexchange.com/questions/87118/how-can-i-create-the-illusion-of-a-3d-object-moving-around-in-a-static-backgroun. Nov. 11, 2014. pp. 1-3.

Oliver, Antony. "Bentley acquisition allows 3D modelling direct from digital photographs." *Infrastructure Intelligence*, http://www.infrastructure-intelligence.com/article/feb-2015/bentley-acquisition-allows-3d-modelling-direct-digital-photographs. Feb. 10, 2015, pp. 1-4.

Huber, et al. "Real-time Photo-realistic Visualization of 3D Environments for Enhanced Tele-operation of Vehicles." *IEEE 12th International Conference on Computer Vision Workshops*. Kyoto, Japan. 2009. pp. 1-8.

\* cited by examiner

VIRTUAL ENVIRONMENT RENDERING

BACKGROUND

Video games, simulators, and virtual reality attractions are examples of ways in which virtual environments are used to provide deeply immersive and stimulating sensory experiences to users. One constraint imposed by conventional approaches to rendering virtual environments is the time required to include realistic three-dimensional (3D) virtual objects, such as buildings or vehicles for example, in the virtual environment. Conventional techniques for producing virtual environments that include 3D virtual objects typically require the use of photogrammetry, and the careful modeling and texturing of the 3D objects, which is a time consuming process. Moreover, despite the time invested in modeling and texturing, when 3D objects are conventionally rendered in a virtual environment, for example by a game or simulation engine, such 3D objects undesirably tend to lack realism.

SUMMARY

There are provided systems and methods for rendering virtual environments, substantially as shown in and/or described in connection with at least one of the figures, and as set forth more completely in the claims.

DETAILED DESCRIPTION

Figure 1:
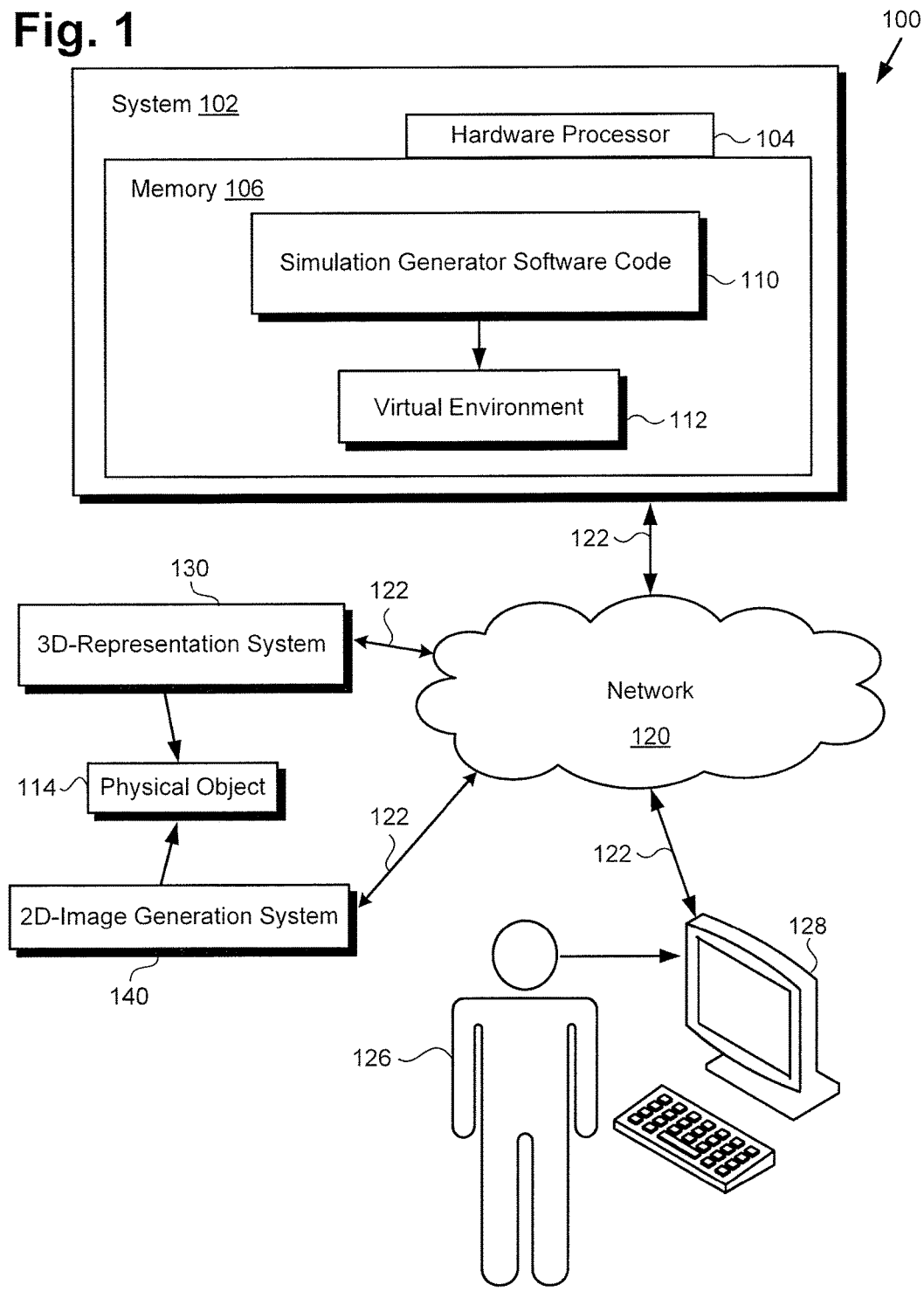
FIG. 1 shows a diagram of an exemplary system for rendering a virtual environment, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, one constraint imposed by conventional approaches to rendering virtual environments is the time required to include realistic three-dimensional (3D) virtual objects, such as buildings or vehicles for example, in the virtual environment. As further stated above, conventional techniques for producing virtual environments that include 3D virtual objects typically require the use of photogrammetry, and the careful modeling and texturing of the 3D objects, which is a time consuming process. Nevertheless, and despite the time invested in modeling and texturing, when 3D objects are conventionally rendered in a virtual environment, such 3D objects undesirably tend to lack realism.

The present application discloses an improved virtual environment rendering solution that utilizes a 3D-representation of a physical object and a two-dimensional-image (2D-image) of the same physical object to render a 3D virtual object corresponding to the physical object in a virtual space. By using the 3D-representation to capture the geometry of the physical object, the present solution advantageously utilizes the 3D-representation of the physical object as a non-visible constraint on the travel path of an action figure moving in or through the virtual space, as well as to provide realistic occlusion effects. Moreover, by using the 2D-image to capture the appearance of the physical object at substantially any desired level of detail, the present solution advantageously enables the visible rendering of a highly realistic 3D virtual object in the virtual space.

FIG. 1 shows a diagram of an exemplary system for rendering a virtual environment, according to one implementation. As shown in FIG. 1, system environment 100 includes virtual environment rendering system 102, communication network 120, user 126, and user system 128. In addition, system environment 100 includes 3D-representation system 130, 2D-image generation system 140, and physical object 114.

Virtual environment rendering system 102 includes hardware processor 104, and system memory 106 storing simulation generator software code 110 and virtual environment 112 rendered using simulation generator software code 110. Also shown in FIG. 1 are network communication links 122 interactively connecting user system 128, 3D-representation system 130, and 2D-image generation system 140 with virtual environment rendering system 102, through communication network 120.

It is noted that although FIG. 1 shows 3D-representation system 130 and 2D-image generation system 140 as separate elements of system environment 100, external to virtual environment rendering system 102, that representation is merely exemplary. In some implementations, virtual environment rendering system 102 may include one or both of 3D-representation system 130 and 2D-image generation system 140. For example, 3D-representation system 130 may take the form of a 3D-scanner, while 2D-image generation system 140 may take the form of a video or still photography camera.

According to the exemplary implementation shown by FIG. 1, user 126 may utilize user system 128 to view, use, or otherwise interact with virtual environment 112, over communication network 120. In one such implementation, virtual environment rendering system 102 may correspond to one or more web servers, accessible over a packet network such as the Internet, for example. Alternatively, virtual environment rendering system 102 may correspond to one or more servers supporting a local area network (LAN), or included in another type of limited distribution network.

Although user system 128 is shown as a personal computer (PC) in FIG. 1, that representation is also provided merely as an example. In other implementations, user system 128 may be another type of mobile or stationary computing device or system. For example, user system 128 may be implemented as a laptop computer, a tablet computer, a gaming console, or a mobile communication device such as a smartphone, for example.

Simulation generator software code 110, executed by hardware processor 104, may receive a 3D-representation of physical object 114 over communication network 120. For example, in implementations in which 3D-representation system 130 includes a 3D-scanner, 3D-representation system 130 may produce a 3D-scan of physical object 114, which may be a replica, such as a miniature replica, of a building, vehicle, or other object. The 3D-scan of physical object 114 may then be received by simulation generator software code 110 of virtual environment rendering system 102 via communication network 120.

According to the implementation shown in FIG. 1, simulation generator software code 110, executed by hardware processor 104, may also receive a 2D-image of physical object 114 over communication network 120. For example, in implementations in which 2D-image generation system 140 includes a video camera or still photography camera, 2D-image generation system 120 may generate video or a digital photograph, such as a high resolution digital photograph, of physical object 114. The video of physical object 114, or the digital photograph of physical object 114, may then be received by simulation generator software code 110 of virtual environment rendering system 102 via communication network 120.

In addition, simulation generator software code 110, executed by hardware processor 104, may compose a simulation of virtual environment 112 using the 3D-representation and the 2D-image received from respective 3D-representation system 130 and 2D-image generation system 140. In such a simulation, the 3D-representation of physical object 114 may be situated in virtual environment 112 between the 2D-image of physical object 114 and a predetermined viewpoint of virtual environment 112, for example, the predetermined perspective of user 126 of virtual environment 112.

In implementations in which virtual environment 112 is a video gaming environment, for example, i.e., is provided as part of a video game, the predetermined viewpoint may substantially coincide with the viewpoint of a player-user 126 of the video game. Simulation generator software code 110, executed by hardware processor 104, may then render virtual environment 112 such that the 2D-image of physical object 114, but not the 3D-representation of physical object 114, is visibly rendered.

Figure 2:
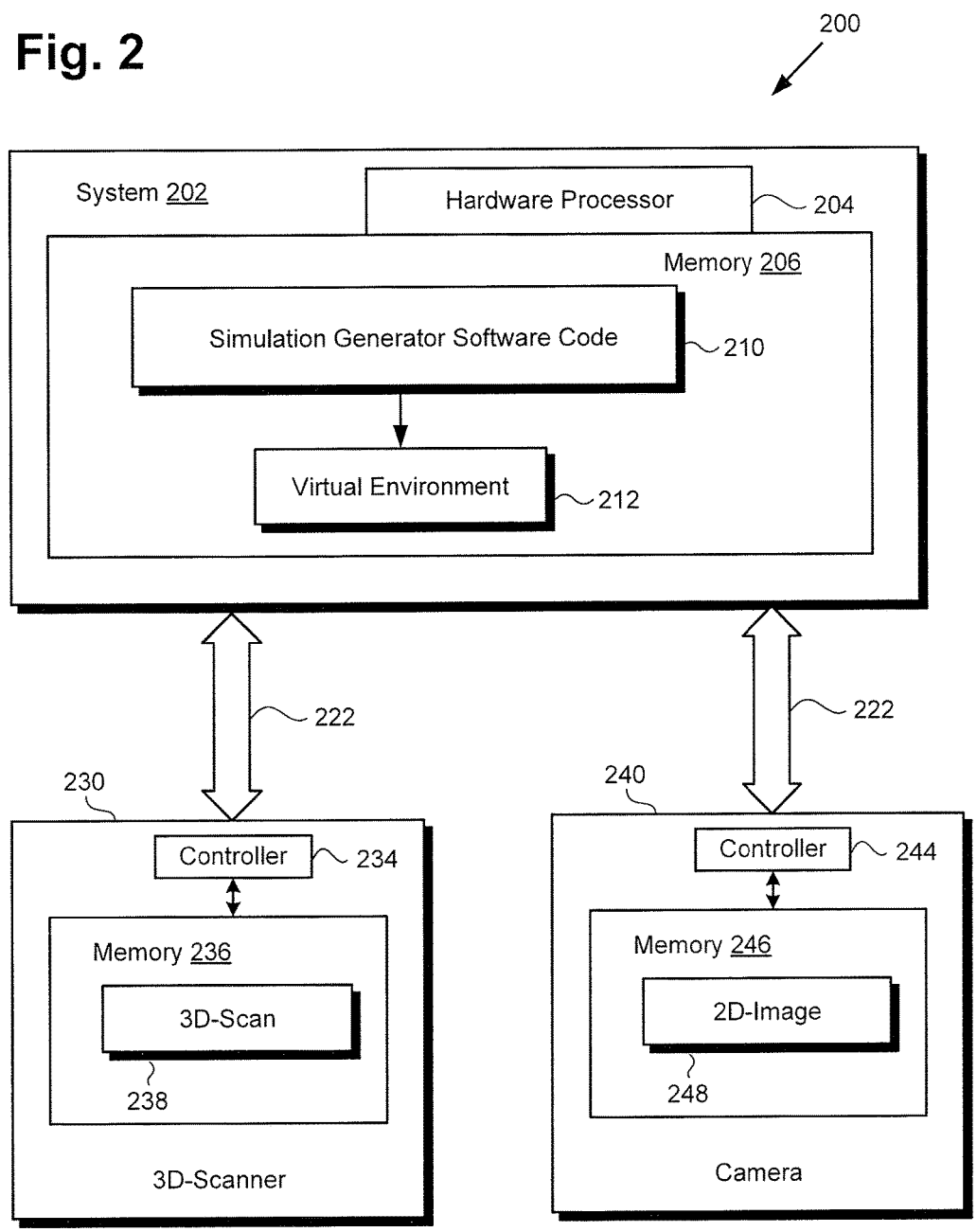
FIG. 2 shows another exemplary implementation of a system for rendering a virtual environment.

FIG. 2 shows another exemplary implementation of a virtual environment rendering system. System environment 200 includes virtual environment rendering system 202 in communication with 3D-scanner 230 and camera 240 over network communication link 222. Virtual environment rendering system 202 is shown to include hardware processor 204, and system memory 206 storing simulation generator software code 210 and virtual environment 212.

Virtual environment rendering system 202, which includes hardware processor 204 and system memory 206, corresponds in general to virtual environment rendering system 102 including hardware processor 104 and system memory 106, in FIG. 1, and may share any of the characteristics attributed to that corresponding feature in the present application. Moreover, simulation generator software code 210 and virtual environment 212 rendered using simulation generator software code 210, in FIG. 2, correspond respectively in general to simulation generator software code 110 and virtual environment 112, in FIG. 1, and may share any of the characteristics attributed to those corresponding features in the present application.

In addition, 3D-scanner 230, camera 240, and network communication links 222, in FIG. 2, correspond respectively in general to 3D-representation system 130, 2D-image generation system 140, and network communication links 122, in FIG. 1, and may share any of the characteristics attributed to those corresponding features in the present application. As shown in FIG. 2, 3D-representation system 130/230, which may be implemented as a 3D-scanner, for example, includes controller 234 and memory 236, while 2D-image generation system 140/240, which may be implemented as a video or still photography camera, for example, includes controller 244 and memory 246. Also shown in FIG. 2 is 3D-scan 238 of physical object 114 residing in memory 226 of 3D-representation system/scanner 130/230, and 2D-image 248 of physical object 114 residing in memory 246 of 2D-image generation system/camera 140/240.

According to the implementation shown in FIG. 2, the presence of 3D-scan 238 and 2D-image 248 correspond to their capture and transmission to virtual environment rendering system 102/202, by respective 3D-representation system/scanner 130/230 and 2D-image generation system/camera 140/240, over network communication links 122/222. In other words, simulation generator software code 110/210, executed by hardware processor 104/204, receives 3D-scan 238 and 2D-image 248 over communication network 120. It is noted that network communication links 122/222 are shown as two-way communication links to represent possible ongoing communication between virtual environment rendering system 102/202 and either or both of 3D-representation system/scanner 130/230 and 2D-image generation system/camera 140/240.

Controller 234 of 3D-representation system/scanner 130/230 may be a microprocessor implemented so as to control the operation of 3D-representation system/scanner 130/230. As noted above, in some implementations, 3D-representation system/scanner 130/230 may be included as a feature of virtual environment rendering system 102/202. Analogously, controller 244 of 2D-image generation system/camera 130/230 may be may be a microprocessor implemented so as to control the operation of 2D-image generation system/camera 140/240. As further noted above, in some implementations, 2D-image generation system/camera 140/240 may be included as a feature of virtual environment rendering system 102/202.

Figure 3:
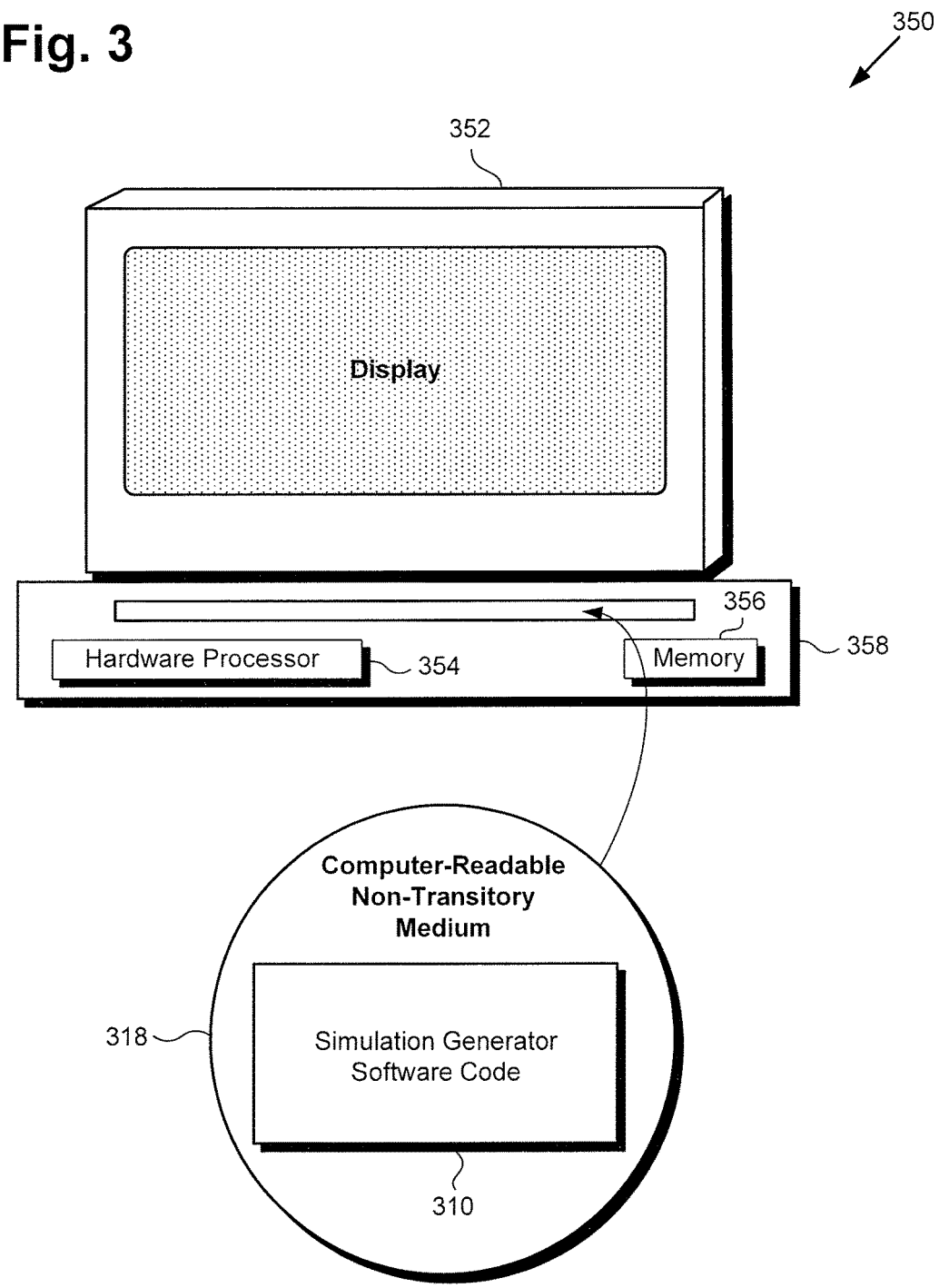
FIG. 3 shows an exemplary system and a computer-readable non-transitory medium including instructions for rendering a virtual environment.

FIG. 3 shows an exemplary system and a computer-readable non-transitory medium including instructions for rendering a virtual environment, according to one implementation. System 350, in FIG. 3, includes computer 358 having hardware processor 354 and system memory 356, interactively linked to display 352. Display 352 may take the form of a liquid crystal display (LCD), a light-emitting diode (LED) display, an organic light-emitting diode (OLED) display, or another suitable display screen that performs a physical transformation of signals to light. System 350 including hardware processor 354 and system memory 356 corresponds in general to either or both of virtual environment rendering systems 102 and 202 in FIGS. 1 and 2, and may share any of the characteristics attributed to those corresponding features in the present application.

Also shown in FIG. 3 is computer-readable non-transitory medium 318 having simulation generator software code 310 stored thereon. The expression "computer-readable non-transitory medium," as used in the present application, refers to any medium, excluding a carrier wave or other transitory signal, that provides instructions to hardware processor 354 of computer 358. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 318 provides simulation generator software code 310 for execution by hardware processor 354 of computer 358. Simulation generator software code 310 corresponds in general to simulation generator software code 110/210, in FIG. 1/2, and is capable of performing all of the operations attributed to those corresponding features in the present application. In other words, simulation generator software code 310 may be executed by hardware processor 354 to render a virtual environment (not shown in FIG. 3) corresponding to virtual environment 112/212 in FIG. 1/2.

Figure 4:
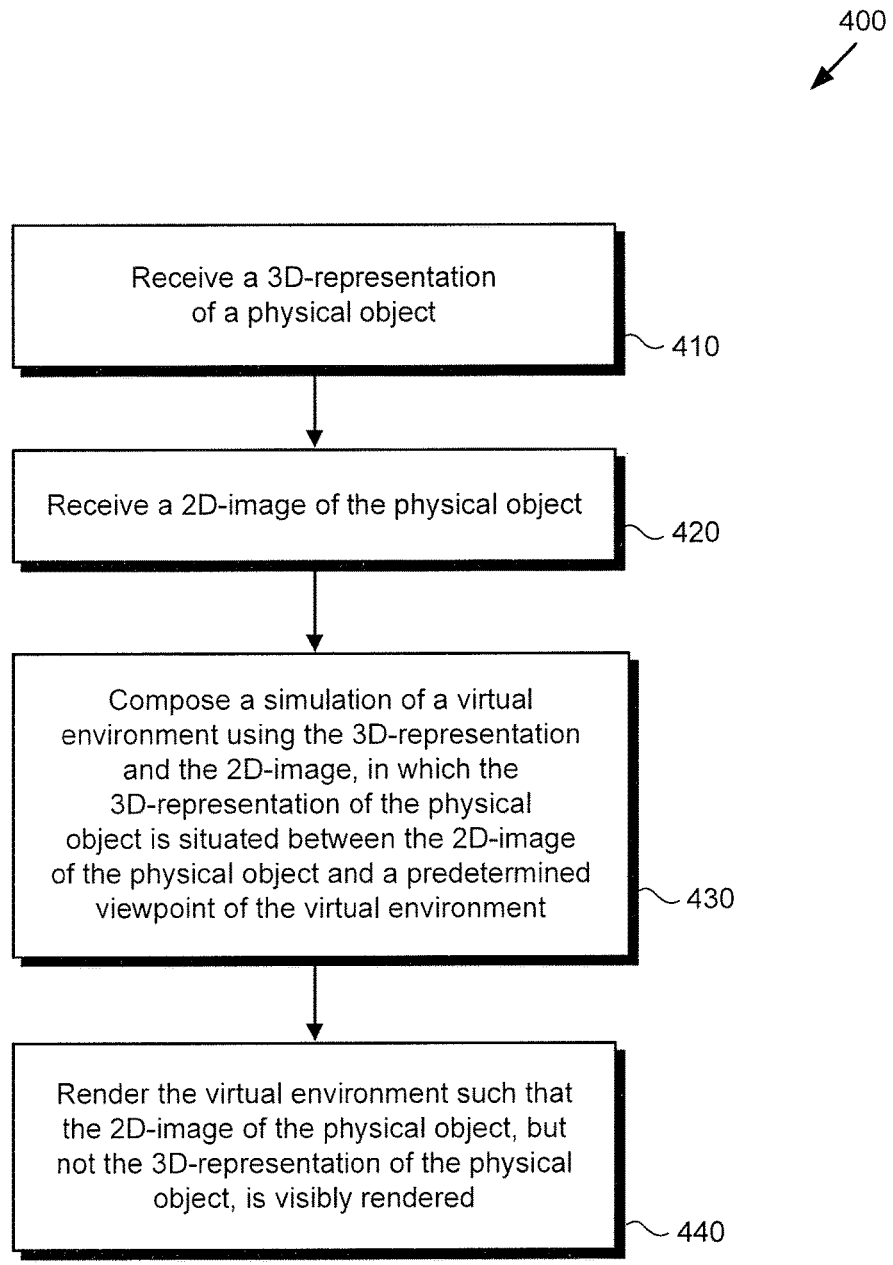
FIG. 4 is a flowchart presenting an exemplary method for use by a system to render a virtual environment.
Figure 5:
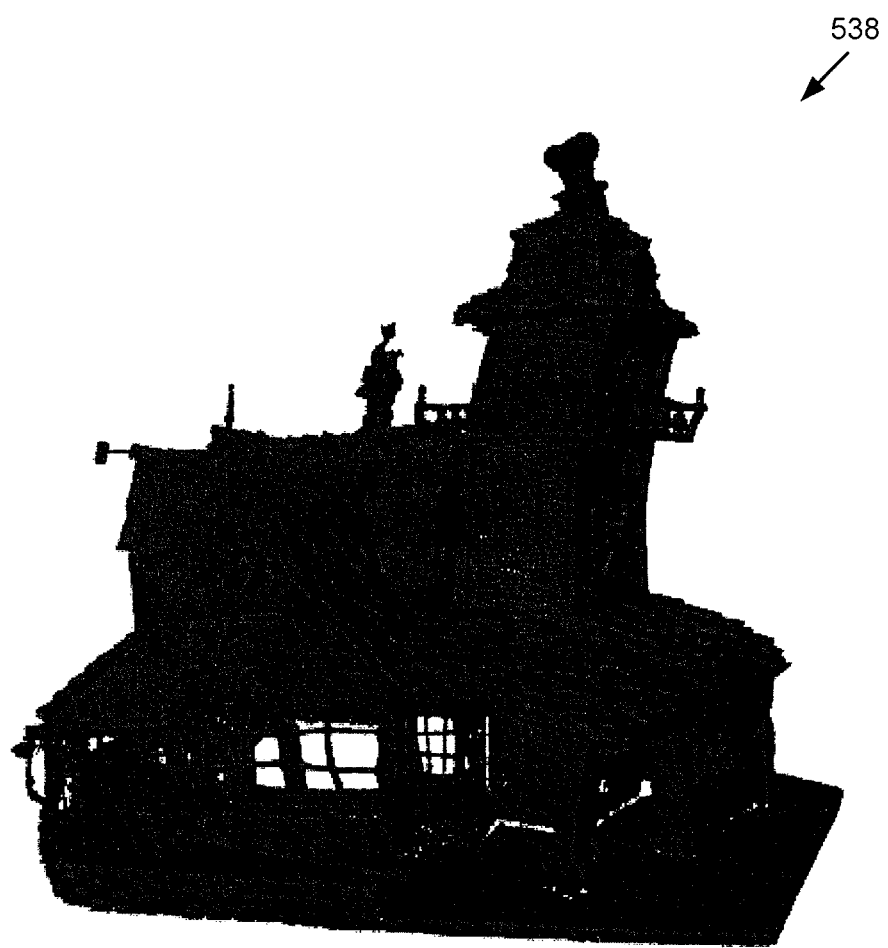
FIG. 5 shows an exemplary three-dimensional-representation (3D-representation) of a physical object, according to one implementation.
Figure 6:
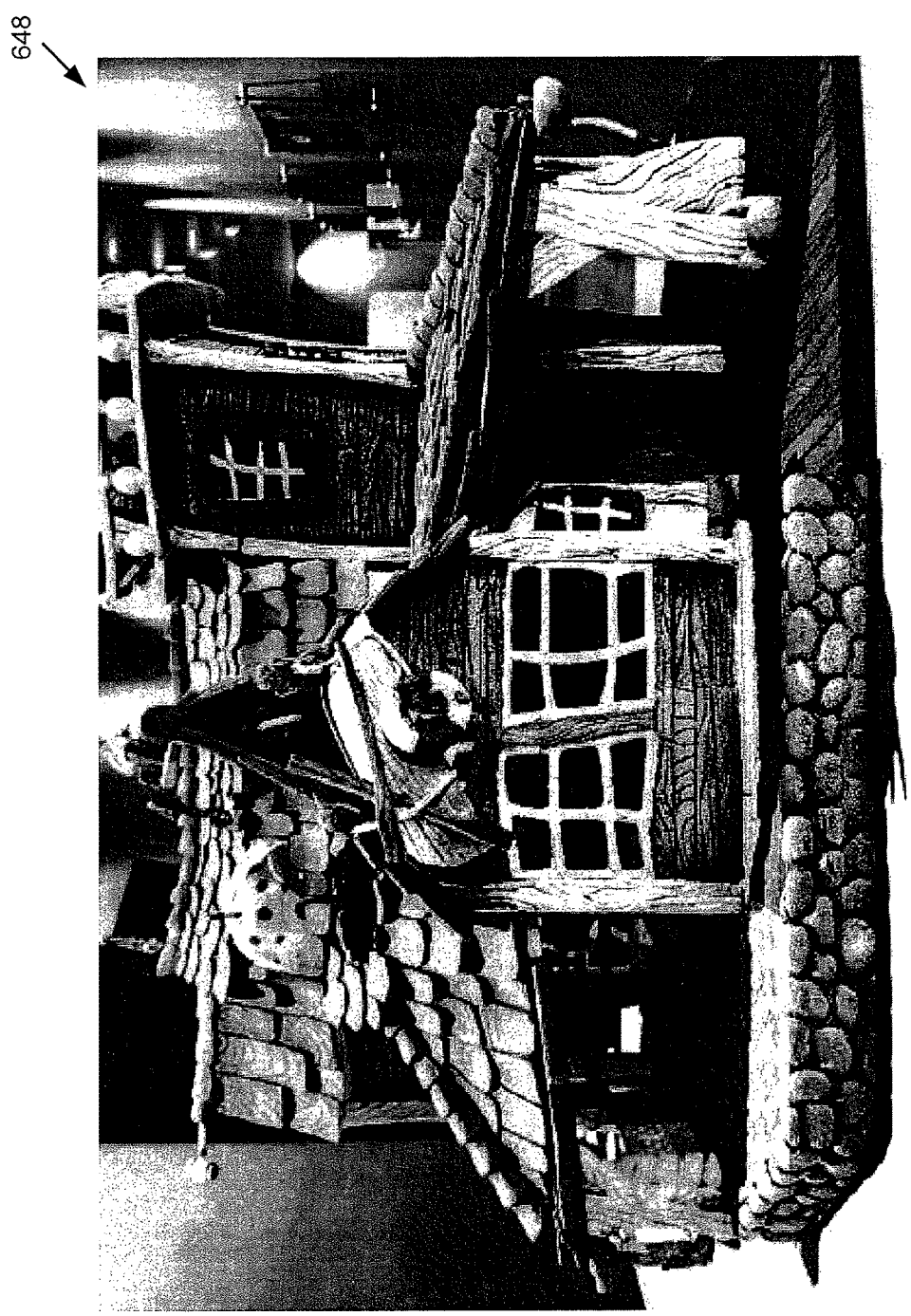
FIG. 6 shows an exemplary two-dimensional-image (2D-image) of the physical object represented in FIG. 5, according to one implementation.

The present inventive concepts will now be further described with reference to FIGS. 4, 5, and 6. FIG. 4 is a flowchart presenting an exemplary method for use by a system to render a virtual environment. FIG. 5 shows exemplary 3D-representation 538 of physical object 114, according to one implementation, while FIG. 6 shows exemplary 2D-image 648 of physical object 114, according to one implementation. With respect to the method outlined in FIG. 4, it is noted that certain details and features have been left out of flowchart 400 in order not to obscure the discussion of the inventive features in the present application.

Referring to FIG. 4 in combination with FIGS. 1, 2, 3, and 5 flowchart 400 begins with receiving 3D-representation 238/538 of physical object 114 (action 410). 3D-representation 238/538 of physical object 114 may be received by simulation generator software code 110/210/310, executed by hardware processor 104/204/354, from 3D-representation system/3D-scanner 130/230, via communication network 120. Moreover, and as shown in FIGS. 2 and 5, the 3D-representation of physical object 114 may be received as 3D-scan 238/538 of physical object 114.

In some implementations, it may be advantageous or desirable for 3D-representation/3D-scan 238/538 to substantially reproduce the geometry of physical object 114, but not to convey detailed aesthetics such as surface color or shading, for example. Such an exemplary use case is shown by FIG. 5, in which 3D-representation/3D-scan 538 substantially reproduces the shape and relative physical dimensions of physical object 114, but does not depict color, symbolism, or any non-structural aesthetic features of physical object 114.

Referring to FIG. 4 in combination with FIGS. 1, 2, 3, and 6 flowchart 400 continues with receiving 2D-image 248/648 of physical object 114 (action 420). 2D-image 248/648 of physical object 114 may be received by simulation generator software code 110/210/310, executed by hardware processor 104/204/354, from 2D-image generation system/camera 140/240, via communication network 120. Moreover, and as shown in FIGS. 2 and 6, the 2D-image of physical object 114 may be received as high resolution photograph 238/538 of physical object 114. It is noted, however, that in other implementations, the 2D-image of physical object 114 may be received as standard definition (SD) or high definition (HD) video of physical object 114.

In some implementations, it may be advantageous or desirable for 2D-image 248/648 to substantially reproduce the non-structural aesthetic features omitted from 3D-representation/3D-scan 238/538. Such an exemplary use case is shown by FIGS. 5 and 6, in which the non-structural aesthetic features of physical object 114 absent from 3D-representation/3D-scan 538 are shown in faithful detail by 2D-image 648.

Flowchart 400 continues with composing a simulation of virtual environment 112/212 using 3D-representation/3D-scan 238/538 and 2D-image 248/648, in which 3D-representation/3D-scan 238/538 of physical object 114 is situated between 2D-image 248/648 of physical object 114 and a predetermined viewpoint of virtual environment 112/212 (action 430). Composition of the simulation of virtual environment 112/212 using 3D-representation/3D-scan 238/538 and 2D-image 248/648 may be performed by simulation generator software code 110/210/310, executed by hardware processor 104/204/354.

As noted above, in implementations in which virtual environment 112/212 is a video gaming environment, for example, i.e., is provided as part of a video game, the predetermined viewpoint of virtual environment 112/212 may substantially coincide with the viewpoint of a player-user 126 of the video game. Alternatively, in implementations in which virtual environment 112/212 is implemented as part of a theme park attraction simulator, such as a roller coaster or other ride simulator, for example, the predetermined viewpoint of virtual environment 112/212 may substantially coincide with the viewpoint of rider-user 126 of the simulator.

Flowchart 400 may conclude with rendering virtual environment 112/212 such that 2D-image 248/648 of physical object 114, but not 3D-representation/3D-scan 238/538 of physical object 114, is visibly rendered (action 440). Rendering of virtual environment 112/212 such that 2D-image 248/648 of physical object 114 is visibly rendered but 3D-representation/3D-scan 238/538 of physical object 114 is not visibly rendered, may be performed by simulation generator software code 110/210/310, executed by hardware processor 104/204/354.

According to the present implementation, simulation generator software code 110/210/310 uses 3D-representation/3D-scan 238/538, which captures the geometry of physical object 114, as a non-visible constraint on the travel path of an avatar or action figure moving in or through virtual environment 112/212. Simulation generator software code 110/210/310 may also use 3D-representation/3D-scan 238/538 to provide realistic occlusion effects within virtual environment 112/212. For example, use of 3D-representation/3D-scan 238/538 as a non-visible rendering in virtual environment 112/212 causes the avatar or action figure to move out of view when the avatar/action figure passes behind 3D-representation/3D-scan 238/538 from the perspective of the predetermined viewpoint of virtual environment 112/212.

In addition, according to the present implementation, simulation generator software code 110/210/310 can use 2D-image 248/648 to reproduce the appearance of physical object 114 at substantially any desired level of detail. As a result, virtual environment rendering system 102/202/350 advantageously enables the visible rendering of one or more highly realistic 3D virtual objects in virtual environment 112/212.

Thus, the present application discloses an improved virtual environment rendering solution that utilizes a 3D-representation of a physical object and a 2D-image of the same physical object to render a 3D virtual object corresponding to the physical object in a virtual space. By using the 3D-representation to capture the geometry of the physical object, the present solution advantageously utilizes the 3D-representation of the physical object as a non-visible constraint on the travel path of an action figure moving in or through the virtual space, as well as to provide realistic occlusion effects. Moreover, by using the 2D-image to capture the appearance of the physical object at substantially any desired level of detail, the present solution advantageously enables the visible rendering of a highly realistic 3D virtual object in the virtual space.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for rendering a virtual environment, the system comprising:
    a hardware processor and a memory;
    a simulation generator software code stored in the memory;
    wherein the hardware processor is configured to execute the simulation generator software code to:
        receive a three-dimensional-representation (3D-representation) of a physical object;
        receive a two-dimensional-image (2D-image) of the physical object;
        compose a simulation of the virtual environment using the 3D-representation and the 2D-image, wherein the 3D-representation of the physical object is situated between the 2D-image of the physical object and a predetermined viewpoint of the virtual environment; and
        visibly render the 2D-image of the physical object in the virtual environment, without visibly rendering the 3D-representation of the physical object in the virtual environment;
        wherein the simulation utilizes the 3D-representation, which is not visibly rendered, to provide non-visible constraints on a travel path of a figure or an avatar moving in or through the virtual environment, and wherein the system does not render the 3D-representation of the physical object in the virtual environment at any stage of the simulation.

2. The system of claim 1, wherein the 2D-image comprises a digital photograph of the physical object.

3. The system of claim 1, wherein the 2D-image comprises a high resolution digital photograph of the physical object.

4. The system of claim 1, wherein the 2D-image comprises video of the physical object.

5. The system of claim 1, further comprising a camera for generating the 2D-image.

6. The system of claim 1, wherein the 3D-representation comprises a 3D-scan of the physical object.

7. The system of claim 1, further comprising a 3D-scanner for generating the 3D-representation.

8. The system of claim 1, wherein the virtual environment is a video gaming environment.

9. A method for use by a system for rendering a virtual environment, the system comprising a hardware processor and a memory having a simulation generator software code stored therein, the method comprising:
    receiving, using the hardware processor, a three-dimensional-representation (3D-representation) of a physical object;
    receiving, using the hardware processor, a two-dimensional-image (2D-image) of the physical object;
    composing, using the hardware processor, a simulation of the virtual environment using the 3D-representation and the 2D-image, wherein the 3D-representation of the physical object is situated between the 2D-image of the physical object and a predetermined viewpoint of the virtual environment; and
    visibly rendering, using the hardware processor, the 2D-image of the physical object in the virtual environment, without visibly rendering the 3D-representation of the physical object in the virtual environment;
    wherein the simulation utilizes the 3D-representation, which is not visibly rendered, to provide non-visible constraints on a travel path of a figure or an avatar moving in or through the virtual environment, and wherein the system does not render the 3D-representation of the physical object in the virtual environment at any stage of the simulation.

10. The method of claim 9, wherein the 2D-image comprises a digital photograph of the physical object.

11. The method of claim 9, wherein the 2D-image comprises a high resolution digital photograph of the physical object.

12. The method of claim 9, wherein the 2D-image comprises video of the physical object.

13. The method of claim 9, wherein the 3D-representation comprises a 3D-scan of the physical object.

14. The method of claim 9, wherein the virtual environment is a video gaming environment.

15. A computer-readable non-transitory medium having stored thereon instructions, which when executed by a hardware processor, instantiate a method comprising:
    receiving a three-dimensional-representation (3D-representation) of a physical object;
    receiving a two-dimensional-image (2D-image) of the physical object;
    composing a simulation of the virtual environment using the 3D-representation and the 2D-image, wherein the 3D-representation of the physical object is situated between the 2D-image of the physical object and a predetermined viewpoint of the virtual environment; and
    visibly rendering the 2D-image of the physical object in the virtual environment, without visibly rendering the 3D-representation of the physical object in the virtual environment;
    wherein the simulation utilizes the 3D-representation, which is not visibly rendered, to provide non-visible constraints on a travel path of a figure or an avatar moving in or through the virtual environment, and wherein the system does not render the 3D-representation of the physical object in the virtual environment at any stage of the simulation.

16. The computer-readable non-transitory medium of claim 15, wherein the 2D-image comprises a digital photograph of the physical object.

17. The computer-readable non-transitory medium of claim 15, wherein the 2D-image comprises a high resolution digital photograph of the physical object.

18. The computer-readable non-transitory medium of claim 15, wherein the 2D-image comprises video of the physical object.

19. The computer-readable non-transitory medium of claim 15, wherein the 3D-representation comprises a 3D-scan of the physical object.

20. The computer-readable non-transitory medium of claim 15,
   wherein the virtual environment is a video gaming environment.

\* \* \* \* \*